United States Patent [19]
Oda et al.

[11] Patent Number: 5,389,996
[45] Date of Patent: Feb. 14, 1995

[54] DISTANCE MEASURING DEVICE FOR A CAMERA

[75] Inventors: Hajime Oda; Hiroyuki Saito; Michio Kawai, all of Yotsukaido, Japan

[73] Assignee: Seikosha Co., Ltd., Japan

[21] Appl. No.: 144,828

[22] Filed: Oct. 29, 1993

[30] Foreign Application Priority Data

Oct. 29, 1992 [JP] Japan .................. 4-291343

[51] Int. Cl.⁶ .................................................. G03B 13/36
[52] U.S. Cl. .................................................. 354/403
[58] Field of Search ............ 354/403; 356/1, 4; 250/201.4, 201.6

[56] References Cited

U.S. PATENT DOCUMENTS

| | | | |
|---|---|---|---|
| 5,210,585 | 5/1993 | Suzuki | 354/403 X |
| 5,221,955 | 6/1993 | Inoue | 354/403 X |
| 5,235,377 | 10/1993 | Ide et al. | 354/403 |

*Primary Examiner*—W. B. Perkey
*Attorney, Agent, or Firm*—Bruce L. Adams; Van C. Wilks

[57] ABSTRACT

A distance measuring device for a camera has a near infrared light-projecting element for projecting measuring light to be reflected by an object to be photographed. The reflected measuring light is received as a first light beam image at a first position on a surface of a first light-receiving element. The reflected measuring light reflected by the object is also received as a second light beam image at a second position on a surface of a second light-receiving element. A CPU controls the focusing movement of the lens of the camera by computing a distance to the object depending on the first position, compensating the computed distance depending on the second position, and controlling the focusing movement of the lens based on the compensated computed distance. The CPU compares the second position with a predetermined distance value and inhibits the compensation of the computed distance if it is determined that compensation is not necessary.

15 Claims, 8 Drawing Sheets

Fig.6

| X | D (m) |
|---|---|
| 0.1 | ∞ |
| 0.2 | 2.70 |
| 0.3 | 1.37 |
| 0.9 | 0.37 |

DISTANCE MEASURING DEVICE FOR A CAMERA

BACKGROUND OF THE INVENTION

The present invention pertains generally to a distance measuring device for a camera, and more particularly to an active-type distance measuring device which projects a beam of light onto an object to be photographed and receives light reflected by the object to determine the distance to the object.

There are various active-type distance measuring devices know in the art. Typically, when an object to be photographed is not directly in the center of the photographic field of a camera, the object reflects only a portion of the light beam projected by a near infrared light emitting element (IRED), resulting in beam loss. This beam loss results in an inaccurate optical center of gravity of the beam image formed on a semiconductor position sensitive device (PSD), and thus correct object distance information is not obtained.

The configuration of a conventional distance measuring device is shown in FIG. 4. A beam of light having a substantially circular cross section is emitted from an IRED 212 and condensed and projected toward an object 100 to be photographed. The light reflected by the object 100 is condensed by a light receiving lens 221 and is imaged as a light spot on a PSD 222. If the object 100 to be photographed is in a position slightly shifted to the right from the center of a photographic field as shown in FIG. 5(a), the light spot on the PSD 222 is not substantially circular and only a part of the circle is imaged on the PSD 222. At this time, the optical center of gravity of the light spot should be in a position displaced from the center of the PSD 222 by a value L, but it is actually displaced by an additional length of ΔL due to a beam loss. As a result, the position is determined to be farther than the actual position of the object. If the object 100 to be photographed is in a position slightly shifted to the left from the center of the photographic field, the position is determined to be closer than the actual position of the object in the same way. In either case, the photographic lens is driven so that it focuses at a position different from the actual distance to the object to be photographed. This results in a photograph that is out of focus and blurry.

Various conventional methods attempt to overcome the distance error resulting from this partial loss of the reflected light beam, referred to as "beam loss". For example, Japanese Patent Publication No. H3-2611 discloses a distance measuring device comprising a combination of a light projecting element and a light receiving element. However, when assembled on a camera, this device fails to provide a large enough distance between the light projecting and light receiving elements, due to spatial limitations, especially camera width, to be effective in measuring long distances. This reduces the accuracy of the distance measurement obtained when the distance to the object to be photographed is long. Japanese Patent Publication No. H1-288714 discloses a distance measuring device comprising a plurality of light emitting elements and a plurality of light receiving elements. This configuration results in a complicated and expensive device due to the required number of costly light emitting elements and light receiving elements used.

SUMMARY OF THE INVENTION

A primary object of the present invention is to overcome the drawbacks of the conventional art.

Another object of the present invention is to detect beam loss using a simple configuration.

A further object of the present invention is to compensate distance measurement calculations according to the detected beam loss in order to calculate the correct distance to an object to be photographed.

In accordance with the present invention, light projecting means is provided for projecting measuring light on an object to be photographed. First light receiving means receives the measuring light reflected by the object to measure the distance to the object to be photographed. Second light receiving means receives the measuring light reflected by the object to detect an amount of displacement of the optical center of gravity of the image formed by the reflected light beam. Compensating means compensates the output of the first light receiving means dependent on the output of the second light receiving means, and photographic lens controlling means controls movement of a photographic lens according to the output of the compensating means to obtain an in-focus image of the object to be photographed.

In accordance with one embodiment, a near infrared light projecting means projects measuring light to be reflected by an object to be photographed. The reflected measuring light is received as a first light beam image at a first position on a surface of first light receiving means. The reflected measuring light reflected by the object is also received as a second light beam image at a second position on a surface of second light receiving means. A CPU controls the focusing movement of the lens of the camera and includes computing means for computing a distance to the object depending on the first position, compensating means for compensating the computed distance depending on the second position, and photographic lens controlling means for controlling a focus of a photographic lens of the camera depending on the compensated computed distance.

To reduce the disadvantage of compensating the computed distance when not necessary, the control circuit has comparing means for comparing the second position with a predetermined distance value. Inhibiting means inhibits the compensation of the computed distance, if it is determined that compensation is not necessary.

In accordance with the present invention, the first light receiving means is disposed at a base length away from the light projecting means, and the second light receiving means is disposed in the vicinity of the light projecting means. The computing means computes the distance to the object depending on the first position and the base length.

In accordance with another embodiment of the present invention, a half mirror is disposed along an optical axis of the projected measuring light, so that the reflected measuring light traveling back along the optical axis is reflected by the half mirror onto the second light receiving means.

BRIEF DESCRIPTION OF THE DRAWINGS

FIG. 6 shows a ROM table for obtaining the distance of an object to be photographed in accordance with the present invention;

DETAILED DESCRIPTION OF THE INVENTION

Figure 1:
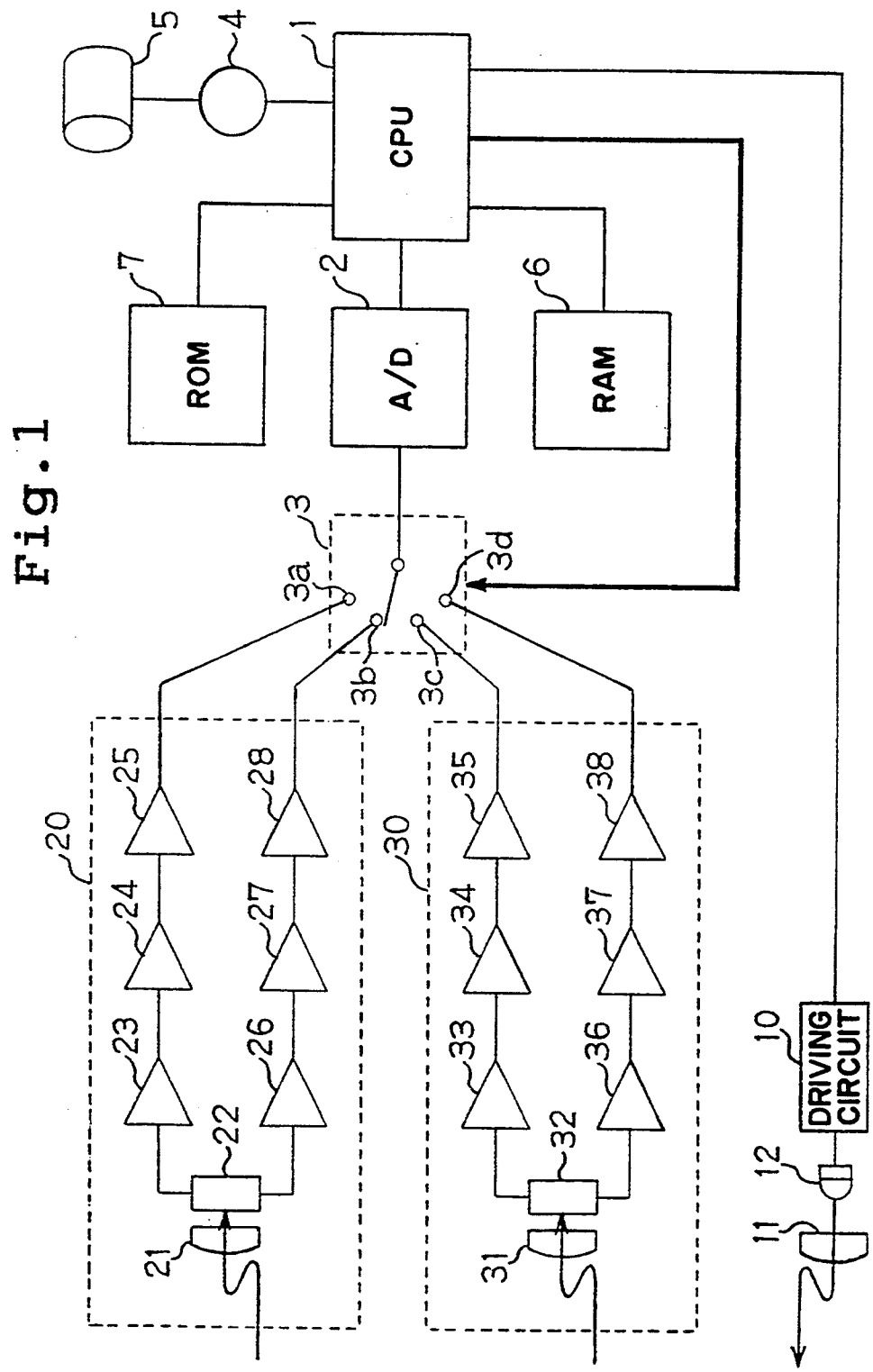
FIG. 1 is a circuit diagram showing one embodiment of a distance measuring device for a camera according to the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated devices, and such further applications of the principles of the invention as disclosed herein, as would normally occur to one skilled in the art to which the invention pertains.

Figure 2:
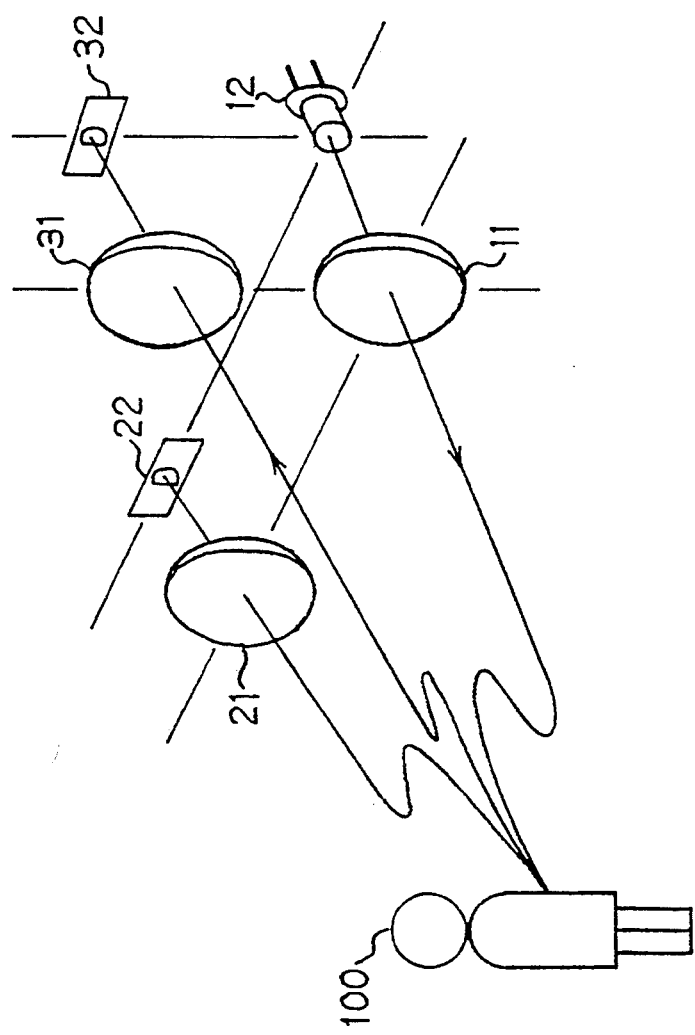
FIG. 2 shows a configuration of light projecting means, lenses and first and second light receiving means in accordance with the present invention.
Figure 3A:
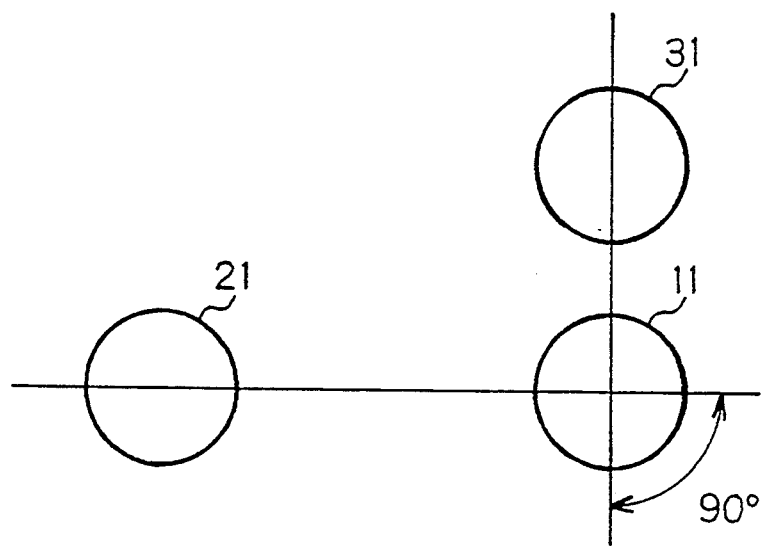
FIG. 3(a) is a plan view showing the arrangement of lenses of an optical system in accordance with the present invention.

Referring to FIGS. 1-3, an embodiment of the present invention will now be described. As shown in FIG. 1, the distance measuring device is provided with a computing circuit or CPU 1. When distance measurement begins, the CPU 1 outputs a light projection pulse signal to an IRED driving circuit 10, and an IRED 12 is pulse driven to emit light in accordance with the signal. The light emitted by the IRED 12 is condensed by a light projecting lens 11 and projected toward an object 100 to be photographed (shown in FIG. 2).

Figure 3B:
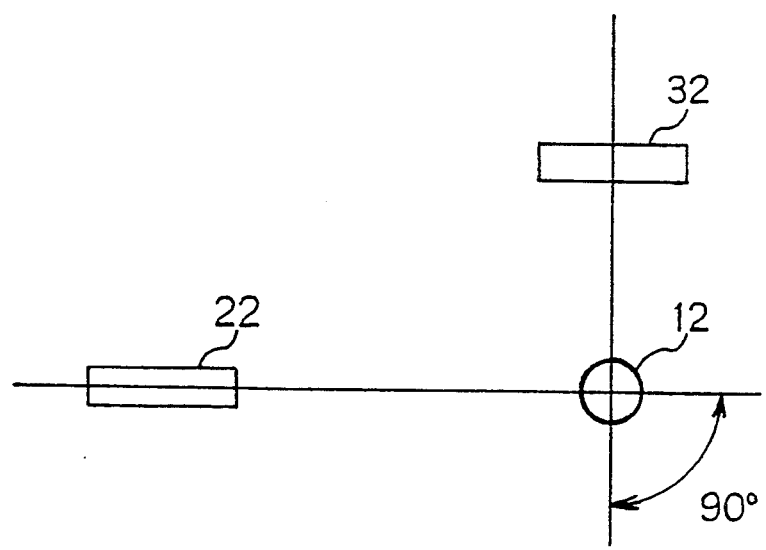
FIG. 3(b) is a plan view showing the arrangement of optical components of the optical system in accordance with the present invention.
Figure 4:
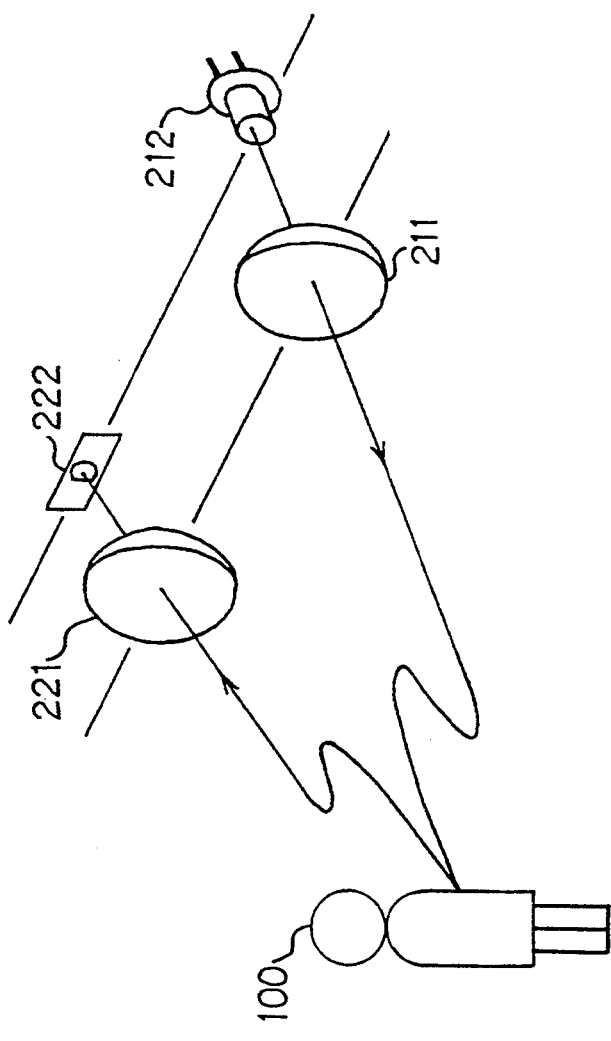
FIG. 4 shows the configuration of an optical system in accordance with a conventional distance measuring device.

As shown in FIG. 2, three lenses comprising the light projecting lens 11, a light receiving lens 21 and a light receiving lens 31 are disposed on the same plane that is perpendicular to the optical axis of the light projected by the IRED 12. The three lenses have the positional relationships shown in FIG. 3(a). The light receiving lens 31 is located perpendicular and adjacent to the light receiving lens 21 when viewed from the light projecting lens 11. The IRED 12, a PSD 22 and a PSD 32 are positioned behind the light projecting lens 11, the light receiving lens 21, and the light receiving lens 31, respectively, along the respective optical axes as shown in FIG. 3(b).

A portion of the light reflected by the object 100 is condensed by the light receiving lens 21 and is incident on the PSD 22 of a distance detecting circuit 20 (shown in FIG. 1). The PSD 22 has two analog outputs, one of which is sent through an amplifier 23, an AGC 24 (automatic gain control circuit) and an I-V converter 25 (current-to-voltage converter) to a terminal 3a of a multiplexer 3. The other output of the PSD 22 is sent through an amplifier 26, an AGC 27 and an I-V converter 28 to a terminal 3b of the multiplexer 3. Another portion of the light reflected by the object 100 is condensed by the light receiving lens 31 and is incident on the PSD 32 of a beam loss detecting circuit 30. The PSD 32 has two analog outputs, one of which is sent through an amplifier 33, an AGC 34 and an I-V converter 35 to a terminal 3c of the multiplexer 3. The other output of the PSD 32 is sent through an amplifier 36, an AGC 37 and an I-V converter 38 to a terminal 3d of the multiplexer 3. The multiplexer 3 selects one of the above four outputs in accordance with a signal from the CPU 1, and outputs the selected signal to an A/D converter 2. The A/D converter 2 converts the input analog voltage to a digital signal and outputs the digital signal to the CPU 1. The CPU 1 processes the four input signals to the multiplexer 3 on a time sequence basis by switching the contacts 3a-3d of the multiplexer 3 and performs A/D conversion on each input signal to obtain distance information which is stored in a RAM 6.

To calculate the distance to the object 100, the distance information in the RAM 6 is read out and a value X having a 1:1 relationship with the distance to the object 100 is calculated. The value X is compared with a lookup table in a ROM 7 to obtain the distance. A driving signal is output to a lens barrel driving device 4 depending on the value thus obtained to drive a lens barrel 5.

The operation of the circuit shown in FIG. 1 will now be described. Prior to operation, the CPU 1 switches an analog switch in the multiplexer 3 to the contact 3a. Next, a light projection signal (for example, a pulse signal of 500 Hz having a 5% duty cycle and 16 cycles) is output to the IRED driving circuit 10 to drive the IRED 12 accordingly. The projection light emitted by the IRED 12 is reflected as a light signal by the object 100. A portion of the light reflected by the object 100 is condensed by the light receiving lens 21 and is incident on the PSD 22. A photoelectric current output from the PSD 22 is converted into a voltage and amplified by the amplifier 23, the AGC 24 and the I-V converter 25. In this manner, a light signal is converted into a voltage which is input through the multiplexer 3 to the A/D converter 2, whereby it is converted into a digital value V1 which is output to the CPU 1. The CPU 1 stores the value V1 in the RAM 6. At this point, the value V1 can be expressed as follows from the nature of the PSD 22, where L1 represents the length of the longer side of the PSD 22, and a value α represent a proportionality constant:

$$V1 = a \cdot (L + \Delta L)/L1 \qquad (a)$$

Next, the CPU 1 switches the analog switch in the multiplexer 3 to the contact 3b to perform a similar light projecting operation. The reflected light is converted into a digital value V2 in accordance with the received light signal and outputted to the CPU 1. The CPU 1 stores the value V2 in the RAM 6. At this point, the value V2 can be expressed as follows:

$$V2 = \alpha \cdot [L - (L + \Delta L)]/L1 \quad \text{((b))}$$

Next, the CPU 1 switches the analog switch in the multiplexer 3 to the contact 3c to perform similar light projecting operation, and the reflected light is converted into a digital value v1 in accordance with the received light signal and outputted to the CPU 1. The CPU 1 stores the value v1 in the RAM 6. At this point, the value v1 can be expressed as follows from the nature of the PSD 32, where L2 represents the length of the longer side of the PSD 32 and a value $\beta$ represents a proportionality constant:

$$v1 = \beta \cdot (L2/2 + \Delta L)/l2 \quad \text{(c)}$$

Finally, the CPU 1 switches the analog switch in the multiplexer 3 to the contact 3d to perform a similar light projecting operation, and the reflected light is converted into a digital value v2 in accordance with the received light signal and outputted to the CPU 1. The CPU 1 stores the value v2 in the RAM 6. At this point, the value v2 can be expressed as follows:

$$v2 = \beta \cdot [L2 - (L2/2 + \Delta L)]/L2 \quad \text{(d)}$$

The four light projecting operations described above provide two voltages V1 and V2 required for calculating the distance to the object 100, and voltages v1 and v2 relating to beam loss.

Figure 5A:
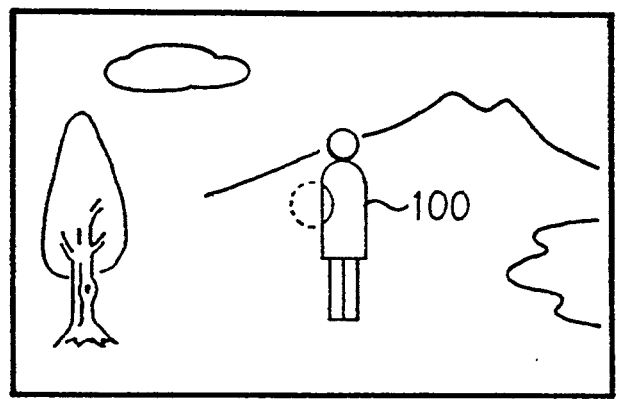
FIG. 5(a) shows a photographic field of a camera wherein beam loss occurs.
Figure 5B:
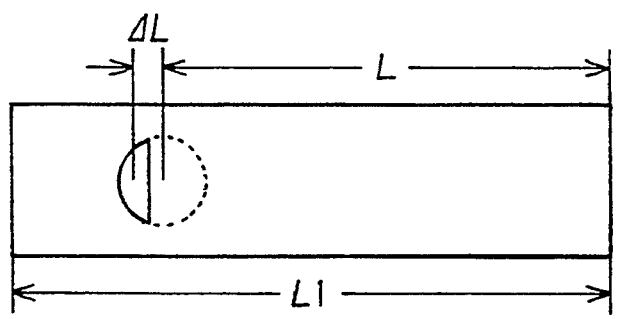
FIG. 5(b) illustrates a light beam image formed on the first light receiving means when the object to be photographed is shifted slightly to the right of the photographic field of a camera.

When the object 100 is at the center of the photographic field of the camera, the entire projection light from the IRED 12 is irradiated onto the object 100, and the light reflected by the object 100 forms an image on the PSD 22 which is substantially circular. In this case, there is little possibility of an error in distance measurement. However, when the object 100 is slightly shifted to the right of the center of the photographic field (as shown in FIG. 5(a)), the light reflected by the object 100 forms an image on the PSD 22 which is only partly circular, as described above. The optical center of gravity of the light beam image that would be formed if the object 100 were at the center of the photographic field (i.e., if a substantially circular light image were formed) would be at a position that is a distance L from an edge of the PSD 22. However, since the optical center of gravity is displaced in the direction opposite to the IRED 12 by an additional distance $\Delta L$, the conventionally determined distance to the object 100 would be shorter than the actual distance. In accordance with the present invention, this error in distance determination is avoided.

Figure 5C:
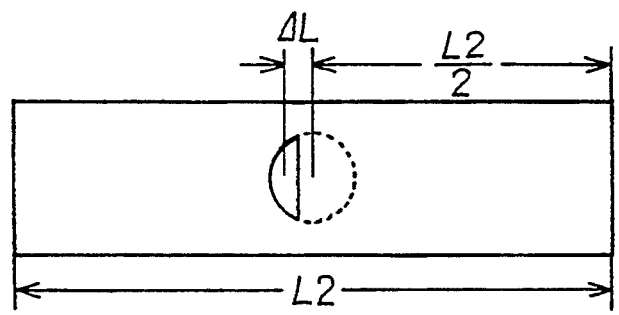
FIG. 5(c) illustrates a light beam image formed on the second light receiving means when the object to be photographed is shifted slightly to the right of the photographic field of a camera.

In accordance with the present invention, the light reflected by the object 100 forms an image as shown in FIG. 5(c) on the PSD 23. Therefore, the length $\Delta L$ can be calculated using the above-described two values v1 and v2 stored in the RAM 6. The CPU 1 reads the two values v1 and v2 from the RAM 6 and eliminates the proportionality coefficient value $\beta$ to obtain the length $\Delta L$ as follows:

$$\Delta L = (v1 - v2)/(v1 + v2) \cdot L2/2 \quad \text{(e)}$$

The CPU 1 includes comparing means for comparing the length $\Delta L$ with a predetermined length $\Delta L$min. If the length $\Delta L$ is shorter than the length $\Delta L$min, there is little or no beam loss. In this case, taking the length $\Delta L$ into consideration may reduce, rather than increase, the reliability of the calculated distance value, due to the presence of noise and the like. Therefore, the CPU 1 preferably includes inhibiting means for selectively inhibiting the output of the PSD 32 from effecting distance calculation, so that if $\Delta L \approx \Delta L$min, the CPU 1 reads only the two values V1 and V2 from the RAM 6 to calculate the distance value X as follows:

$$X = (L + \Delta L)/L1 = (V1/(V1 + V2)) \quad \text{(f)}$$

If the value X is equal to or greater than a fixed value Xnear (i.e., the distance to the object 100 is smaller than a predetermined distance Lnear), then the diameter of the reflected light beam is often sufficiently small so that the compensation process need not be performed. In this case, the value X is calculated according to the equation (g), described below.

If the length $\Delta L$ is equal to or greater than the length $\Delta L$min, then it is determined that there is a beam loss. The CPU 1 reads the two values V1 and V2 from the RAM 6 and eliminates the term of the length $\Delta L$ to calculate the value X as follows:

$$X = L/L1 = V1/(v1 + V2) - L2 \cdot (v1 - v2)/[2 \cdot L1 \cdot (v1 + v2)] \quad \text{(g)}$$

If the PSD 22 and the PSD 32 are of the same form, then the length L1 and length L2 are equal to each other. This further simplifies the equation (g) as follows:

$$X = V1/(v1 + V2) - (v1 - v2)/[2 \cdot (v1 + v2)] \quad \text{(h)}$$

Figure 6:
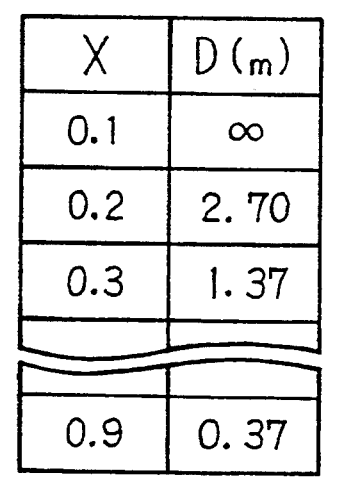

The CPU 1 can obtain the distance to the object 100 according to the value X thus obtained by referring to a lookup table (FIG. 6) stored in advance in the ROM 7.

Although one-dimensional position detecting elements are used as the light receiving elements in the present invention, other kinds of light receiving elements, such as split SPDs or CCDs, can be used.

Figure 7:
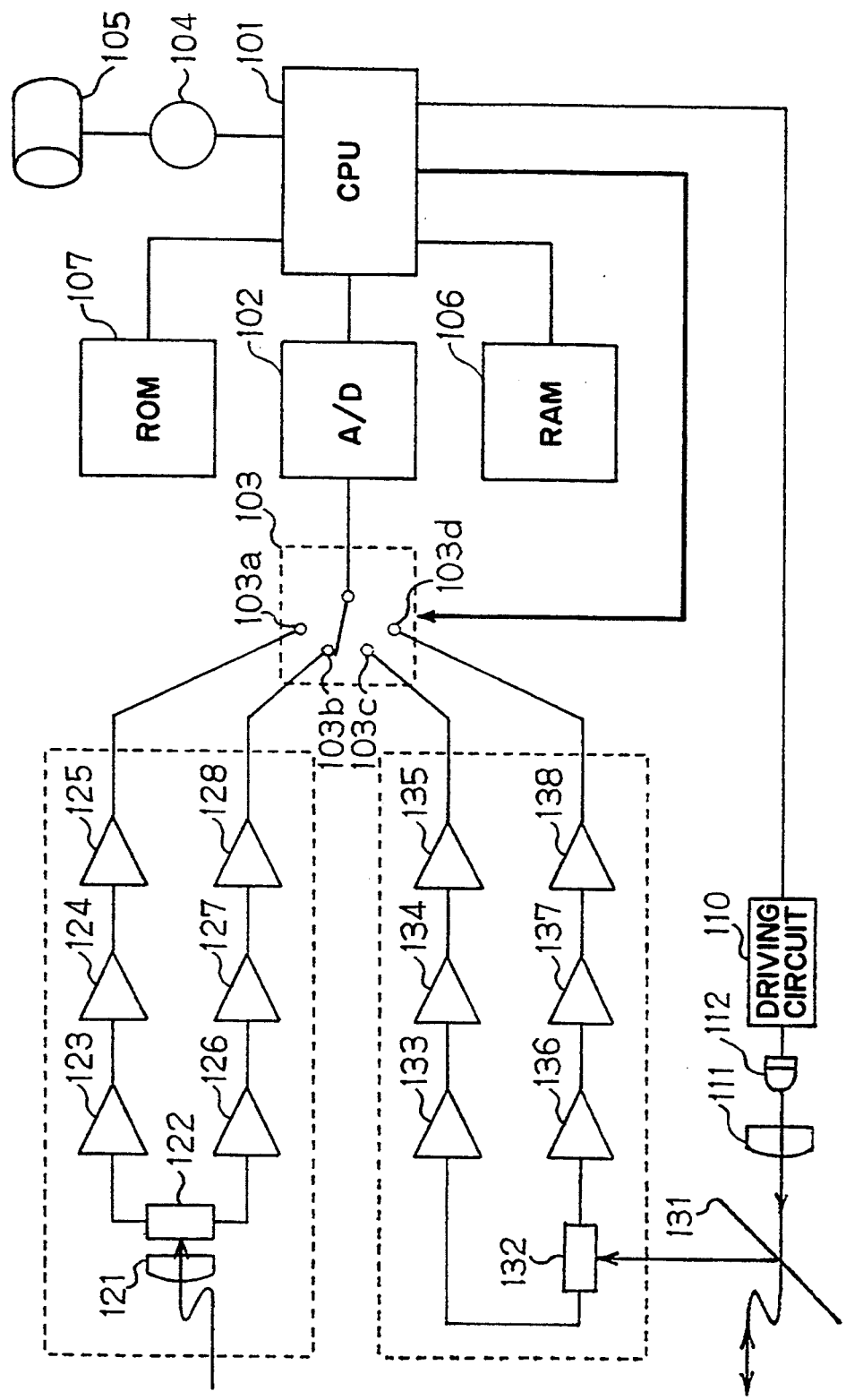
FIG. 7 is a circuit diagram of another embodiment of a distance measuring device for a camera according to the present invention.
Figure 8:
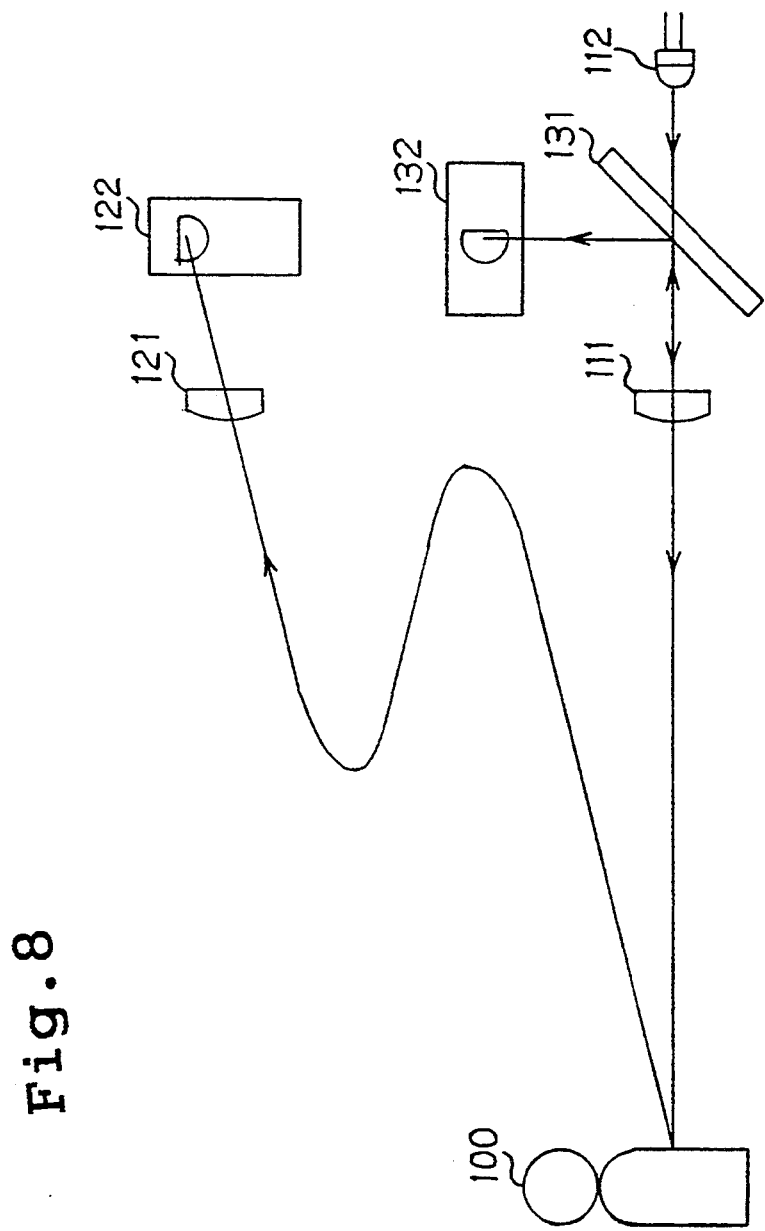
FIG. 8 is a view showing a typical configuration in accordance with the other embodiment of the present invention.

A circuit diagram of another embodiment of the present invention is shown in FIG. 7 and the configuration thereof is shown in FIG. 8. In this case, a half mirror 131 is disposed on the optical axis of the light projecting element (IRED) 112. In this embodiment, a light projecting lens 111, a light receiving element 122 and a light receiving element 132 are provided. The light receiving element 132 (which may be a PSD) is provided for detecting beam loss. The light receiving elements 122 and 132 may be PSDs, half-split SPDs or CCDs.

As shown in FIG. 8, the infrared light beam emitted by the IRED 112 is projected through the light projecting lens 111 onto the object 100 to be photographed. The light beam is reflected by the object 100, and a portion of the reflected light returns along the optical axis of the projection light beam and passes back through the light projecting lens 111. The reflected light beam from the object is then reflected by the half mirror 131 and forms a light beam image on the PSD 132. The remaining operation of this embodiment of the present invention is the same as that described above for the first embodiment.

In accordance with the preset invention, the effect of an error in distance measurement due to beam loss in an active-type distance measuring device can be reduced using a simple and inexpensive optical system and electrical circuit. Thus, the present invention overcomes the drawbacks of the prior art and allows for the taking of photographs with reduced out-of-focus conditions.

We claim:

1. A distance measuring device for a camera, comprising: light projecting means for projecting measuring light to an object to be photographed; first light receiving means disposed at a base length from the light projecting means for receiving measuring light reflected by the object and producing an output representative of the received measuring light; second light receiving means disposed in the vicinity of the light projecting means for receiving measuring light reflected by the object and producing an output representative of the received measuring light; computing means for computing the distance to the object from the output of the first light receiving means depending on the base length and for compensating the computed distance according to the output of the second light receiving means; and photographic lens controlling means for controlling the amount of displacement of a photographic lens according to the output of the first light receiving means.

2. A distance measuring device according to claim 1; including comparing means for comparing the output of the second light receiving means with a predetermined distance value; and inhibiting means for inhibiting the output of the second light receiving means depending on the output of the comparing means.

3. A distance measuring device for a camera according to claim 1; wherein the light projecting means includes a light projecting lens disposed on a plane; the first light receiving means includes a first light receiving lens disposed on the plane; and the second light receiving means includes a second light receiving lens disposed on the plane.

4. A distance measuring device for a camera according to claim 3; wherein the first light receiving lens is disposed perpendicular to and adjacent to the second light receiving lens when viewed from the light projecting lens.

5. A distance measuring device for a camera according to claim 1; wherein the first light receiving means and the second light receiving means comprise at least one of a PSD, an SPD and a CCD.

6. A distance measuring device for a camera according to claim 1; wherein the light projecting means comprises an infrared light projecting element.

7. A distance measuring device for a camera according to claim 1; further comprising a half mirror disposed along an optical axis of the projected measuring light so that the reflected measuring light traveling back along the optical axis is reflected by the half mirror onto the second light receiving means.

8. A distance measuring device for a camera, comprising: light projecting means for projecting measuring light to an object to be photographed; first light receiving means for receiving reflected measuring light reflected by the object as a first light beam image formed at a first position on a surface of the first light receiving means; second light receiving means for receiving reflected measuring light reflected by the object as a second light beam image formed at a second position on a surface of the second light receiving means; and control circuit means for computing a distance to the object based on the first position, compensating the computed distance based on the second position, and controlling displacement of a photographic lens of the camera based on the compensated computed distance.

9. A distance measuring device for a camera according to claim 8; wherein the light projecting means includes a light projecting lens disposed on a plane; the first light receiving means includes a first light receiving lens disposed on the plane; and the second light receiving means includes a second light receiving lens disposed on the plane.

10. A distance measuring device for a camera according to claim 9; wherein the first light receiving lens is disposed perpendicular to and adjacent to the second light receiving lens when viewed from the light projecting lens.

11. A distance measuring device for a camera according to claim 8; wherein the control circuit means includes comparing means for comparing the second position with a predetermined distance value, and inhibiting means for inhibiting the compensation of the computed distance according to the output of the comparing means.

12. A distance measuring device for a camera according to claim 8; wherein the first light receiving means is disposed at a base length away from the light projecting means; the second light receiving means is disposed in the vicinity of the light projecting means; and the control circuit means includes means for computing the distance to the object based on the first position and the base length.

13. A distance measuring device for a camera according to claim 8; wherein the first light receiving means and the second light receiving means comprise at least one of a PSD, an SPD and a CCD.

14. A distance measuring device for a camera according to claim 8; wherein the light projecting means comprises an infrared light projecting element.

15. A distance measuring device for a camera according to claim 8; further comprising a half mirror disposed along an optical axis of the projected measuring light so that the reflected measuring light traveling back along the optical axis is reflected by the half mirror onto the second light receiving means.

* * * * *